(12) United States Patent
Moser et al.

(10) Patent No.: US 8,404,015 B2
(45) Date of Patent: Mar. 26, 2013

(54) FILTER ARRANGEMENT

(75) Inventors: Nikolaus Moser, Ditzingen (DE); Jobst Eisengräber-Pabst, Benningen a.N (DE); Stefan Walz, Freiberg a. N. (DE)

(73) Assignee: Mann+Hummel GmbH, Ludwigsburg (DE)

( * ) Notice: Subject to any disclaimer, the term of this patent is extended or adjusted under 35 U.S.C. 154(b) by 164 days.

(21) Appl. No.: 12/810,154

(22) PCT Filed: Dec. 18, 2008

(86) PCT No.: PCT/EP2008/067911
§ 371 (c)(1),
(2), (4) Date: Dec. 3, 2010

(87) PCT Pub. No.: WO2009/080709
PCT Pub. Date: Jul. 2, 2009

(65) Prior Publication Data
US 2011/0067574 A1    Mar. 24, 2011

(30) Foreign Application Priority Data
Dec. 21, 2007  (DE) .................... 20 2007 018 075 U

(51) Int. Cl.
*B01D 46/00* (2006.01)
(52) U.S. Cl. ............................ 55/385.3; 55/482; 55/505
(58) Field of Classification Search .................. 55/315, 55/385.3; 95/146; 96/108, 153; 123/198 E, 123/184.21, 519, 520; 181/233
See application file for complete search history.

(56) References Cited

U.S. PATENT DOCUMENTS

| | | | | |
|---|---|---|---|---|
| 3,061,039 A * | 10/1962 | Peters | ............................ | 181/233 |
| 4,080,184 A * | 3/1978 | Petersen | ......................... | 55/315 |
| 4,772,299 A * | 9/1988 | Bogusz | ......................... | 55/385.3 |
| 5,125,940 A * | 6/1992 | Stanhope et al. | ............ | 55/385.3 |
| 6,997,977 B2 * | 2/2006 | Dallas et al. | .................... | 96/153 |
| 7,069,893 B2 * | 7/2006 | Cusumano et al. | ....... | 123/184.21 |
| 7,918,912 B2 * | 4/2011 | Tomlin et al. | ................. | 55/385.3 |
| 2008/0127949 A1 * | 6/2008 | Herald et al. | .................. | 123/519 |

FOREIGN PATENT DOCUMENTS

| | | |
|---|---|---|
| DE | 1007294 | 5/1957 |
| DE | 202006003137 | 7/2007 |
| WO | WO03023217 | 3/2003 |
| WO | WO2005095783 | 10/2005 |
| WO | WO2007003442 | 1/2007 |
| WO | WO2007062715 | 6/2007 |

OTHER PUBLICATIONS

DPMA search report on priority application. PCT search report of international application.

* cited by examiner

*Primary Examiner* — Duane Smith
*Assistant Examiner* — Minh-Chau Pham
(74) *Attorney, Agent, or Firm* — James Hasselbeck

(57) ABSTRACT

The invention relates to a filter arrangement (1) for filtering a fluid, e.g. combustion air for a combustion engine. Said filter arrangement has several tubular sections or segments (2, 3). At least part of a wall (4) of at least one tubular section (2) comprises a filter material (4B). At least one tubular section (3) is designed in a bendable manner like a folding joint (5A).

15 Claims, 4 Drawing Sheets

FILTER ARRANGEMENT

CROSS REFERENCE TO RELATED APPLICATIONS

This application is US National Stage Entry of international patent application no. PCT/EP2008/067911, filed Dec. 18, 2008 designating the United States of America, the entire disclosure of which is incorporated herein by reference. Priority is claimed based on German patent application 20 2007 018075.6 filed in Germany on Dec. 21, 2007.

TECHNICAL FIELD

The present invention concerns a filter arrangement, especially for filtering air in vehicles, in particular intake air for an internal combustion engine of a vehicle. Moreover, the invention concerns a filter arrangement for the filtration of air in the vehicle interior.

Because of increasing air pollution, it is necessary in the field of motor vehicles to purify the air required for combustion of fuels before it is supplied to the internal combustion engine. This is done in general by air filters that are integrated into the respective combustion air intake manifold. Also, for the interior of a motor vehicle it is required to purify the polluted air and to remove coarse particles as well as fine dust.

PRIOR ART

WO 2005/095783 discloses an arrangement comprising a corresponding intake filter that is provided on the underside of the hood of a motor vehicle. Here, a filter element of a hose-shaped body is provided in an airtight cover connected to the hood. The raw air to be combusted is introduced into the cavity existing underneath the hood and is then supplied as purified air from the interior of the filter element through a connecting hose to the internal combustion engine.

A disadvantage in this connection is an increase of weight of the hood as well as the required volume between hood and the engine compartment of the vehicle. As a result of the additional elements that are integrated into the hood, this can also have a negative effect on pedestrian protection because a deformation upon impact of objects on the hood is made more difficult.

It is therefore an object of the present intention to provide an improved filter arrangement.

SUMMARY OF THE INVENTION

Accordingly, a filter arrangement for filtering a fluid, in particular of combustion air for an internal combustion engine, comprising several tubular sections is provided. In this connection, a wall of at least one tubular section comprises at least partially a filter material and at least one tubular section is bendable like a bellows joint.

This filter arrangement has several sections or segments that are combined to a complete filter arrangement. The various segments can be constructed, for example, completely of filter material in tubular shape so that, for example, air filtration from an exterior into an interior of the respective tube may be realized. The corresponding filter arrangement may be installed in a space-saving way, for example, within an engine compartment of a motor vehicle. As a result of the individual segments that are at least partially bendable, an especially good mounting space utilization is possible.

As a filter material, for example, flexible nonwoven filter material is conceivable that is constructed of synthetic fibers.

The filter material moreover can be combined with active carbon particles or other adsorbent media in order to further improve the filter efficiency. It is moreover possible to enlarge the filter surface area in that along a longitudinal axis of a tubular section or segment longitudinal folds are provided.

Segments or tubular sections that are especially strongly loaded can be manufactured of a fluid-tight material, for example, plastic material or metal.

In variants of the filter arrangement tubular sections are provided that have a polygonal cross-section. Thus, it is not mandatory to employ a round or oval cross-section for a tubular or a hose-shaped segment of the filter arrangement.

In this connection, preferably at least one tubular section with transverse folds is provided. In this way, the corresponding tubular section is compressible and/or expandable along a longitudinal axis. In this way, a further flexibility and versatility of the use of such a filter arrangement is enabled.

In some variants of the filter arrangement, for example, fluid bundling devices for bundling a fluid flow can be provided. This can be realized, for example, by a type of funnel or any other shaped surface.

It is moreover conceivable that one of the segments has a closure. Moreover, branching sections can be provided in the filter arrangement that, like a switch splits an interior or inner tubular space of the filter arrangement.

Preferably, the filter arrangement moreover has at least one tubular section and a coupling section that is provided with coupling means for connecting the tubular section to a further tubular section. In this connection, various coupling means are conceivable, for example, a thread-like coupling, buckle closure, clamping closure, bayonet closure or snap-on closure.

In a preferred embodiment of the filter arrangement, moreover a tubular section is provided that comprises a fluid flow measuring device. Conceivably is, for example, a hot film air mass meter that is used frequently in intake manifolds for combustion air.

In a preferred application of the air filter arrangement, it is provided in an engine compartment of a motor vehicle and the filter arrangement is embodied at least as a part of an intake manifold for combustion air.

Further advantageous embodiments of the invention are the subject matter of the dependent claims as well as of the embodiments described in the following.

BRIEF DESCRIPTION OF THE DRAWINGS

In the following the invention will be explained in more detail with the aid of preferred embodiments with reference to the attached figures. It is shown in.

EMBODIMENT(S) OF THE INVENTION

Figure 1:
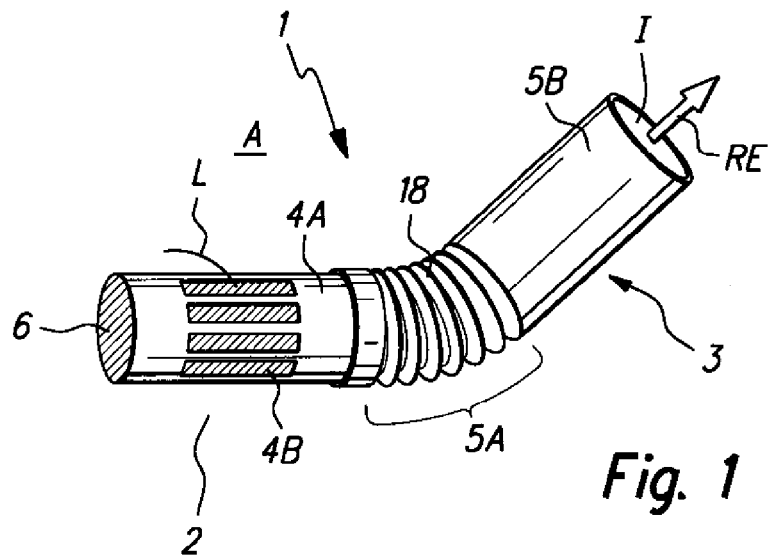
FIG. 1: a perspective illustration of a first embodiment of a filter arrangement.

In FIG. 1 a perspective illustration of a filter arrangement 1 is illustrated. In this connection, two tubular sections 2, 3 are provided that are inserted into one another or connected to one another. The first tubular section or the first segment 2 of the filter arrangement 1 corresponds substantially to a tube and may be made, for example, from plastic material or another suitable material. In the tube wall, locations 4B are provided that are furnished with a filter material. For example, the tubular segment 2 may correspond substantially to a plastic pipe 4A that has cutouts that are filled with a nonwoven filter material 4B.

Accordingly, air L can flow from the exterior into the interior through the filter medium. At the end identified with reference numeral 6 a closure is provided, for example, of fluid-tight material. A second segment 3 adjoins the first segment 2 and comprises a joint area 5A and a straight area 5B. The joint area is substantially formed of radial folds 18 and forms in the way of a bellows joint a bending section of the segment 3.

In operation of the filter arrangement, from the exterior A raw air, for example, flows through the filter material in the partial areas 4B of the first segment into the interior I of the filter arrangement and flows out from the second segment 3 as purified, i.e., clean, air RE. At this point, it can be tapped, for example, for combustion of fuel in an internal combustion engine.

The segments 2, 3 serve thus as tubular base components that as a whole may be joined to a filter arrangement 1. For adaptation to the geometric conditions in the engine compartment, straight and flexible joint members can be used. In FIG. 1, the flexible joint member is embodied, for example, of plastic material but may also be manufactured of a filter material for obtaining a filter action.

Figure 2:
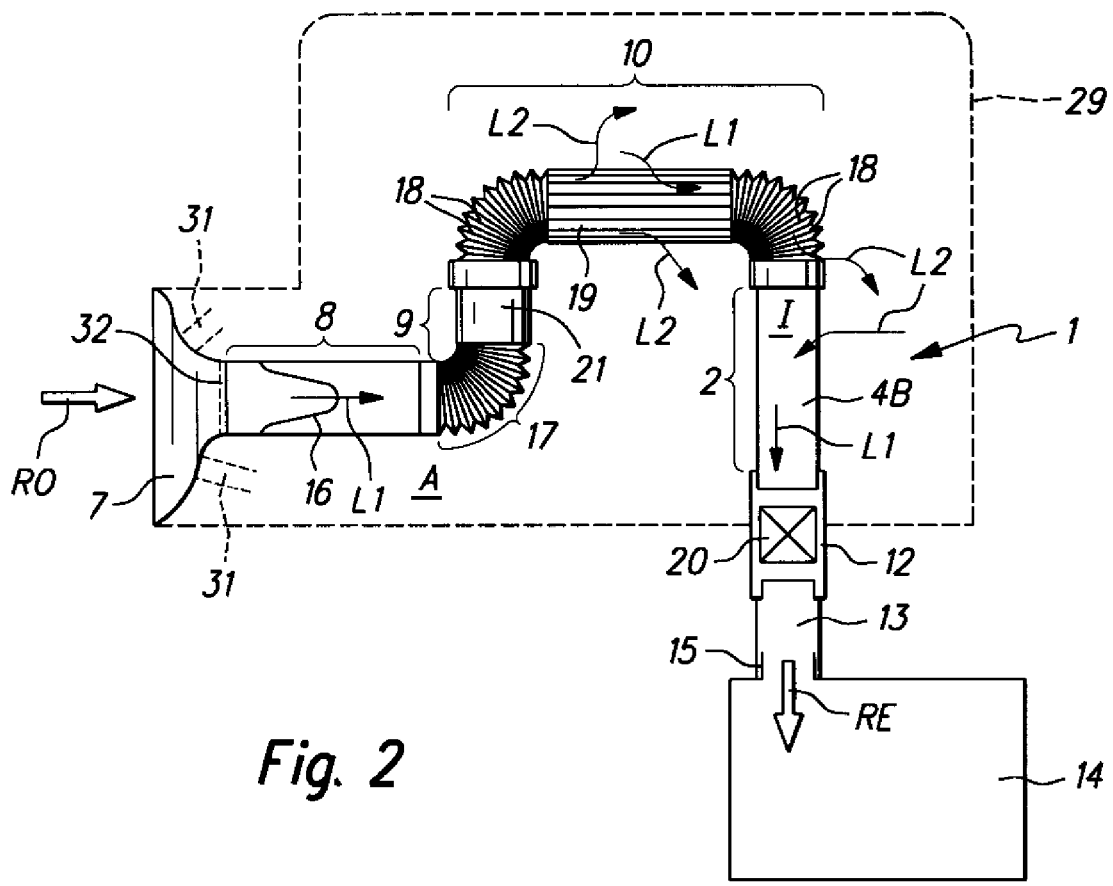
FIG. 2: a cross-sectional view of a second embodiment of a filter arrangement.

In FIG. 2 a second embodiment of a filter arrangement is shown in cross-section. The filter arrangement 1 is shown in an exemplary fashion as being comprised of six tubular segments 8, 9, 10, 2, 20 and 13. The tubular segments 8, 9, 10, 2, 20 and 13 form, for example, a portion of an intake manifold for combustion air for an engine that is identified by reference numeral 14.

At the engine side, a straight segment 13 is coupled to the air intake socket 15 of the engine 14. At the end, a funnel-shaped fluid bundling device 7 is provided that channels raw air RO and allows it to flow into the first tubular section 8 or the first segment 8. In the interior of the first segment 8 there is a hose-shaped or sock-shaped filter element 16 that filters particles to be filtered out of the raw air RO. In a first application variant of the filter arrangement 1, the flow direction is indicated in an exemplary fashion by arrows L1 in FIG. 2.

The second segment 9 comprises a bellows joint-like section 17 and a straight section 21. Therefore, a curved section or bend of the entire filter arrangement 1 can be created. The filter element 16 can be arranged in axial direction in the interior of components 2, 9, 10. It is flowed through in accordance with arrows L1. The filter element ends shortly before the component 12. Component 10 in this case is an impermeable plastic tube. In an alternative embodiment the component 10 is a part of the entire filter element that extends in the interior of an outwardly closed plastic tube. The flow in this case is from the interior to the exterior in the direction of the plastic tube wall and from there into the section 2. When the component/segment 10 is manufactured of nonwoven material and has folds, the transverse folds 18 are provided at the connecting areas and are bent like a bellows joint. A straight intermediate section, in contrast to this, has longitudinal folds so that the filter surface area of the segment 10 is enlarged.

For this purpose, a fourth straight tubular section 2, for example, of a plastic material that is air-tight is provided. The air-tight section 2 is coupled to a section 12 that has an air mass meter 20. The air mess meter 20 that is, for example, embodied micro-mechanically measures the air mass that is passed through the cylinder, for example, the pipe 12. For example, a hot film air mass meter is conceivable in which the air flow removes heat from a sensor element. The larger the corresponding air mass flow, the more energy must be supplied in order to keep constant the temperature of the corresponding sensor element. The corresponding heating current is thus proportional to the air mass flow and can be detected.

A straight member 13 adjoins the section 12 with the air mass meter 20 and is coupled to an air intake socket 15 of the engine. In the described first application example, air thus flows from the exterior AU into the interior of the filter arrangement 1.

Moreover, an alternative embodiment is conceivable that is explained in FIG. 2 by means of dashed line illustrations. In this case, air flows are conceivable in accordance with arrows L2 beginning at the exterior that is enclosed by a housing 29 (illustrated in dashed lines). In this application mode, the funnel-shaped inlet opening 7 is provided with openings 31 so that raw air RO enters the exterior A, i.e., the intermediate space between the filter arrangement 1 and an appropriate housing wall 29, and builds up overpressure therein. In accordance with this, an end section 32 of the first segment 8 is embodied to be fluid-tight and closes off the entire filter arrangement 1. In contrast to the afore described alternative with air flow according to arrows L1, intake and flow through the filter element are realized now in accordance with arrows L2. This means that the corresponding segment sections 8, 9, 10 and/or 2 that are provided with a nonwoven filter material are flowed through inwardly and the clean air, as in the first variant, reaches the air mass sensor 20 and then flows to the engine 14. In both illustrated variants the individual components 2, 8, 9, 10 can be comprised completely of filter material or partially of plastic material.

Figure 3:
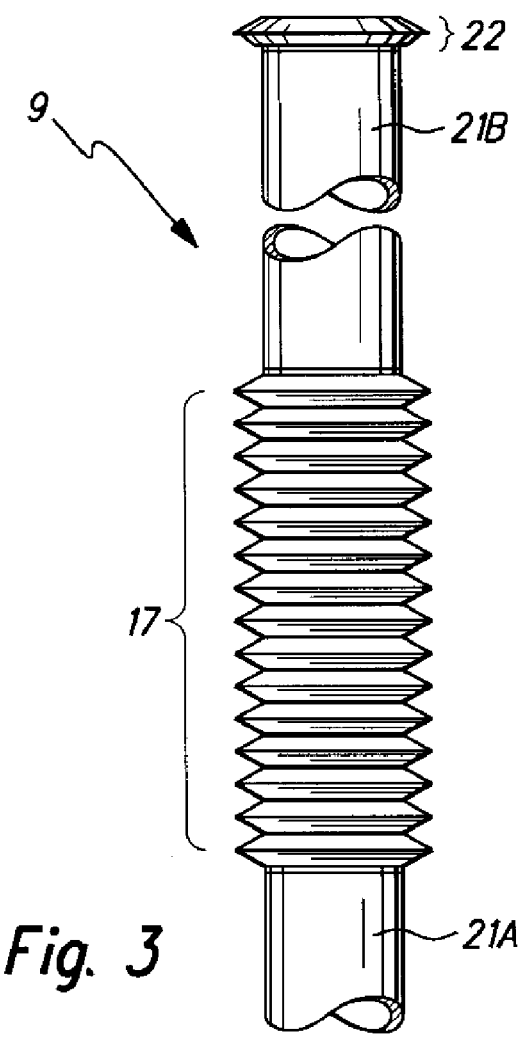
FIG. 3: a cross-sectional view of an embodiment of a tubular section.

In FIG. 3 a cross-sectional view of a segment 9 is illustrated. The segment 9 has in this connection two tubular straight areas 21A, 21B as well as a folded area 17 that forms a joint area so that in the fashion of a bellows joint a bending capability is provided. Moreover, at one end a coupling means, for example, in the form of a flange is provided in order to enable a fluid-tight or air-tight connection with a further segment section.

Figure 4:
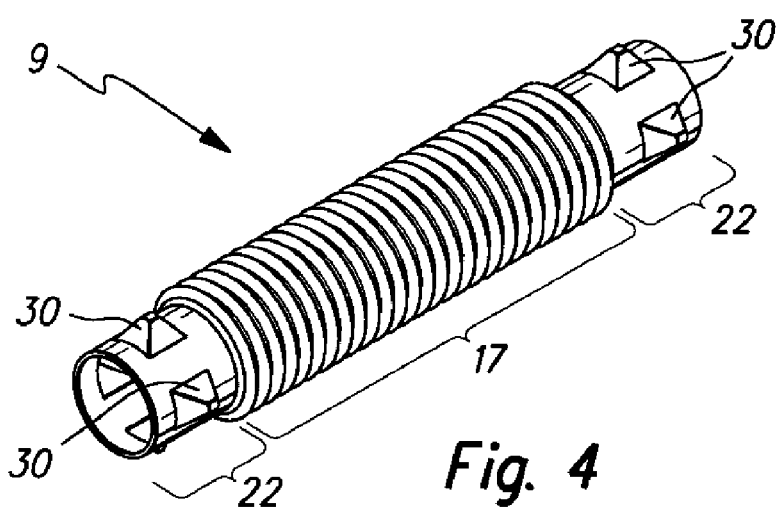
FIG. 4: a perspective view of a second embodiment of a tubular section.

FIG. 4 shows a similar segment 9 that has a central area 17 that is embodied like a bellows joint and has two coupling sections 22 provided with convex projections 30 that are serving as connecting means with appropriately concavely embodied depressions in further tube segments or for centering the filter element in the housing tube.

Figure 5A:
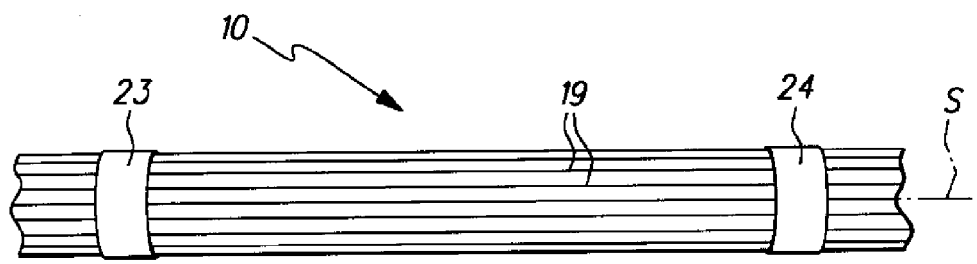
FIGS. 5 A-C: longitudinal and perspective illustrations of an embodiment of a tubular section of nonwoven filter material.

FIG. 5 shows a further embodiment of appropriate tube segments that, for example, are embodied completely of nonwoven filter material. In FIG. 5A a longitudinal section along a symmetry axis S is illustrated wherein nonwoven filter material is folded in zigzag shape and, for example, is glued together in a tubular shape about a symmetry axis S. In this way longitudinal folds 19 are provided that in FIG. 5A are stabilized by tabs or windings 23, 24, also of nonwoven filter material.

Figure 5B:
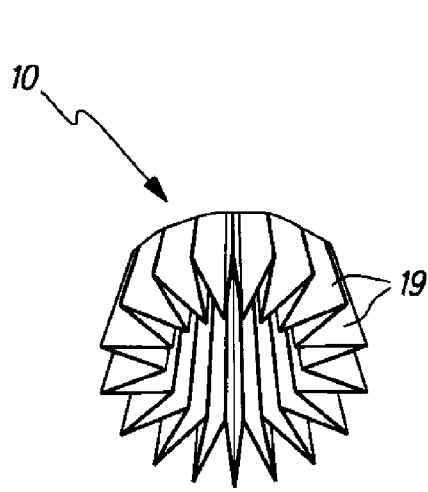

In FIG. 5B a perspective view of the tubular section 10 or of a corresponding opening section is illustrated. FIG. 5 in this connection illustrates a view into the interior I of the corresponding tubular segment 10.

Figure 5C:
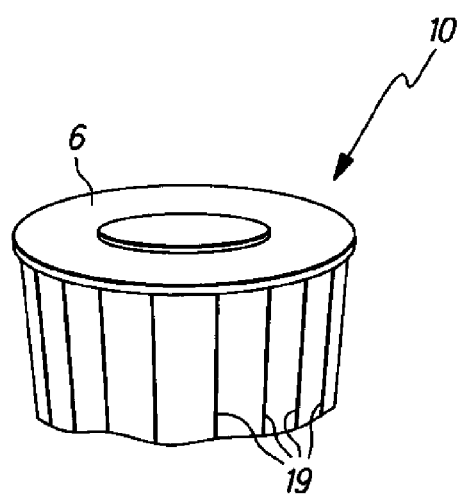

In FIG. 5C, a closure, for example, a glued-on round closure disk 6 is illustrated on a corresponding opening of a longitudinally folded filter material. A corresponding closure 6 can be manufactured of fluid-tight or air-tight or also other fluid-permeable materials.

Figure 6A:
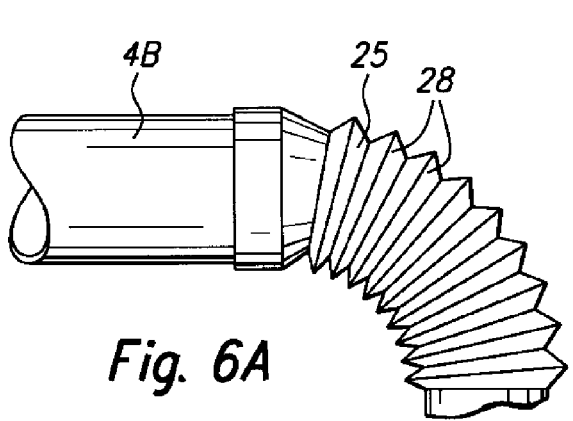
FIGS. 6 A-B: perspective illustrations of a further embodiment of tubular sections of nonwoven filter material.
Figure 6B:
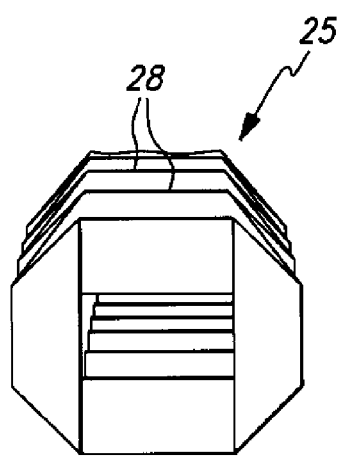

In FIG. 6 perspective views of further embodiments of tubular segments or tubular sections for a filter arrangement are illustrated. In this connection, in FIG. 6 a tubular smooth segment 4B of nonwoven filter material is illustrated that is inserted into a segment 25 that is flexibly embodied by means of suitable transverse folds 28 and, for example, is fixed. This fixation can be realized by gluing or other suitable measurers. As a result of the special fold geometry, the tubular segments 25 is not only bendable but also compressible and/or expandable with respect to length. This is illustrated, for example, in FIG. 6B that shows an opening of the tubular segment 25 with its transverse folds 28.

Figure 7:
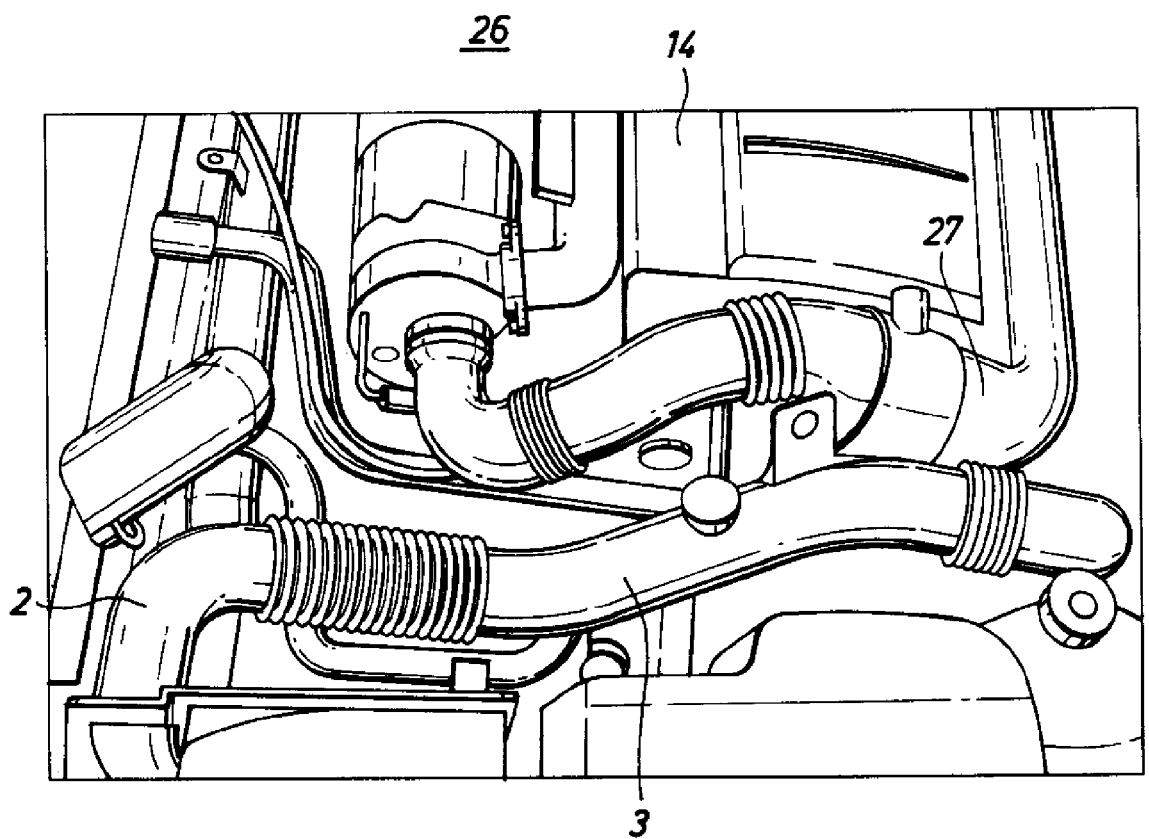
FIG. 7: an application of an embodiment of the filter arrangements in an engine compartment.

Finally, in FIG. 7 the view of a motor compartment 26 with an engine 14 and tubular sections that have been appropriately joined to a filter arrangement is illustrated. The tubular sections 2, 3, 27, 9 form in this connection an important part of an intake manifold for combustion air for the engine 14.

The filter arrangement has in particular the advantage that it is combinable in a modular fashion from various tubular segments and that the existing mounting space in particular in an engine compartment may be utilized particularly efficiently. The filtering surface area of the thus formed tube or hose, i.e., the surface area proportion of the tube wall that is embodied of a filtering material such as, for example, filter material, is based on the required volume flow, the required dust capacity of the filter and the separation degree. The separation degree for the particles to be filtered depends also on the employed filter medium such as, for example, felted nonwoven of synthetic fibers.

The connections between the respective tubular sections employed as base components can be embodied to be non-detachable but also detachable in order to exchange individual tubular sections.

Even though the present invention has been explained with the aid of preferred embodiments in more detail, it is not limited thereto but is modifiable in many ways. The illustrated geometries of the folds as well as the hose-shaped extensions can be matched to the conditions within the engine compartment, respectively. Moreover, also other fluids, for example, fuels as liquids, can be filtered.

The invention claimed is:

1. An air filter arrangement comprising:
a plurality of tubular sections (2,3) coupled end to end;
wherein an outer wall (4) of at least one of said tubular sections (2) comprises an air flow permeable filter material (4B) enabling air flow through said outer wall; and
wherein at least one tubular section (3) is a bendable bellows section;
wherein at least one tubular section (10) has an outer wall formed of an air flow permeable flexible nonwoven filter material.

2. The air filter arrangement of claim 1, wherein at least one tubular section (2) includes a closure cap (6) closing off on an end of said tubular section (2).

3. The air filter arrangement of claim 1, wherein at least one tubular section (10) comprises
said flexible nonwoven filter material of said outer wall is provided with longitudinal folds (19), said longitudinal folds increasing a filtering area of said outer wall.

4. The air filter arrangement of claim 1, wherein:
at least one tubular section (25) has a polygonal cross-section.

5. The air filter arrangement of claim 1, wherein:
said outer wall of at least one tubular section has transverse folds (28), said traverse folds enabling compression and/or expansion along a longitudinal axis.

6. The air filter arrangement of claim 1, wherein at least one tubular section (2, 3) comprises a fluid-tight material.

7. The air filter arrangement of claim 1, further comprising a funnel shaped fluid bundling device secured to an end of one of said plurality of tubular sections.

8. The air filter arrangement of claim 1, wherein:
a fluid filtration is realized from an exterior (A) of the filter arrangement (1) into an interior (I) of the tubular sections (2, 3) through outer walls of said tubular sections.

9. The air filter arrangement of claim 1, wherein:
a fluid filtration is realized from an interior I into an exterior A through outer walls of said tubular sections.

10. The air filter arrangement of claim 1, wherein at least one branch section is provided.

11. The air filter arrangement of claim 1, wherein one or several sections (10, 25) are manufactured completely of filter material.

12. The air filter arrangement of claim 1, wherein at least one tubular section (9) comprises a coupling section (22) with coupling means for connecting the tubular section (9) with a further tubular section.

13. The air filter arrangement of claim 1, wherein at least one tubular section (12) comprises a fluid flow measuring device (20).

14. The air filter arrangement of claim 1, wherein:
at least one of said plurality of tubular sections has an outer wall consisting of an air flow permeable flexible nonwoven filter material;
wherein a first portion of said tubular sections of air flow permeable flexible nonwoven filter material include longitudinal folds in said outer wall, said longitudinal folds increasing a filtering area of said outer wall;
wherein a second portion of said tubular sections of air flow permeable flexible nonwoven filter material include have a polygonal cross-section and traverse folds in said walls of flow permeable flexible nonwoven filter material, said traverse folds configuring said second portion of tubular segments as bendable, compressible and expandable with respect
to length.
wherein fluid filtration is realized through walls of said first portion of tubular segments; and
wherein ends of at least some of said plurality of tubular sections includes a coupling section with coupling means for connecting with a further tubular section.

15. A filter arrangement in an engine compartment of a motor vehicle with a filter arrangement according to claim 1, wherein the filter arrangement is embodied at least as a part of an intake manifold for combustion air.

* * * * *